United States Patent [19]

Lozach

[11] 4,049,760

[45] Sept. 20, 1977

[54] METHOD OF MANUFACTURE OF FOAMED THERMO-PLASTIC EXTRUDED SHAPES

[75] Inventor: Guy Lozach, Chantiliy, France

[73] Assignee: Societe Chimique des Charbonnages, Courbevoie, France

[21] Appl. No.: 672,490

[22] Filed: Mar. 31, 1976

Related U.S. Application Data

[63] Continuation-in-part of Ser. No. 450,838, March 13, 1974, abandoned.

[30] Foreign Application Priority Data

Mar. 16, 1973 France .................. 73.09609

[51] Int. Cl.² ........................................... B29D 27/00
[52] U.S. Cl. ........................................ 264/51; 264/45.3;
264/88; 264/89; 264/210 R; 264/237;
264/DIG. 5; 264/DIG. 17; 425/72 R;
425/326.1; 425/817 C
[58] Field of Search .................... 264/45.5, 48, 88, 89,
264/DIG. 14, 95, 89, 237, 210 R; 425/72 R, 326
R, 817 C

[56] References Cited

U.S. PATENT DOCUMENTS

| | | | |
|---|---|---|---|
| 2,756,461 | 7/1956 | Hadley | 264/88 X |
| 3,317,363 | 5/1967 | Weber | 264/48 X |
| 3,363,034 | 1/1968 | Noland et al. | 264/DIG. 14 |
| 3,548,042 | 12/1970 | Hinrichs | 264/89 |
| 3,764,642 | 10/1973 | Boutillier | 264/DIG. 14 |
| 3,812,230 | 5/1974 | Takahashi | 264/95 X |

FOREIGN PATENT DOCUMENTS

| | | | |
|---|---|---|---|
| 718,810 | 9/1965 | Canada | 264/95 |
| 1,504,310 | 10/1968 | Germany | 264/45.5 |

OTHER PUBLICATIONS

"The Condensed Chemical Dictionary", Eighth Edition, Revised by Gessner G. Hawley, New York, Van Nostrand Reinhold, c1971, pp. 946–947.

*Primary Examiner*—Philip Anderson
*Attorney, Agent, or Firm*—Karl W. Flocks

[57] ABSTRACT

The present invention relates to a method of manufacture of profile-sections of any shape, including complex shapes, of structural foamed thermo-plastic material, having a density of between 0.4 and 0.9 with respect to the corresponding bulk or solid thermo-plastic material, the said method consisting in slowing-down and/or stopping the expansion at the immediate outlet of a conventional extrusion machine, at predetermined zones by blowing or spraying, in a differential manner at the periphery of the extruded product, a fluid at a temperature lower than the softening temperature of the said thermo-plastic material.

10 Claims, 18 Drawing Figures

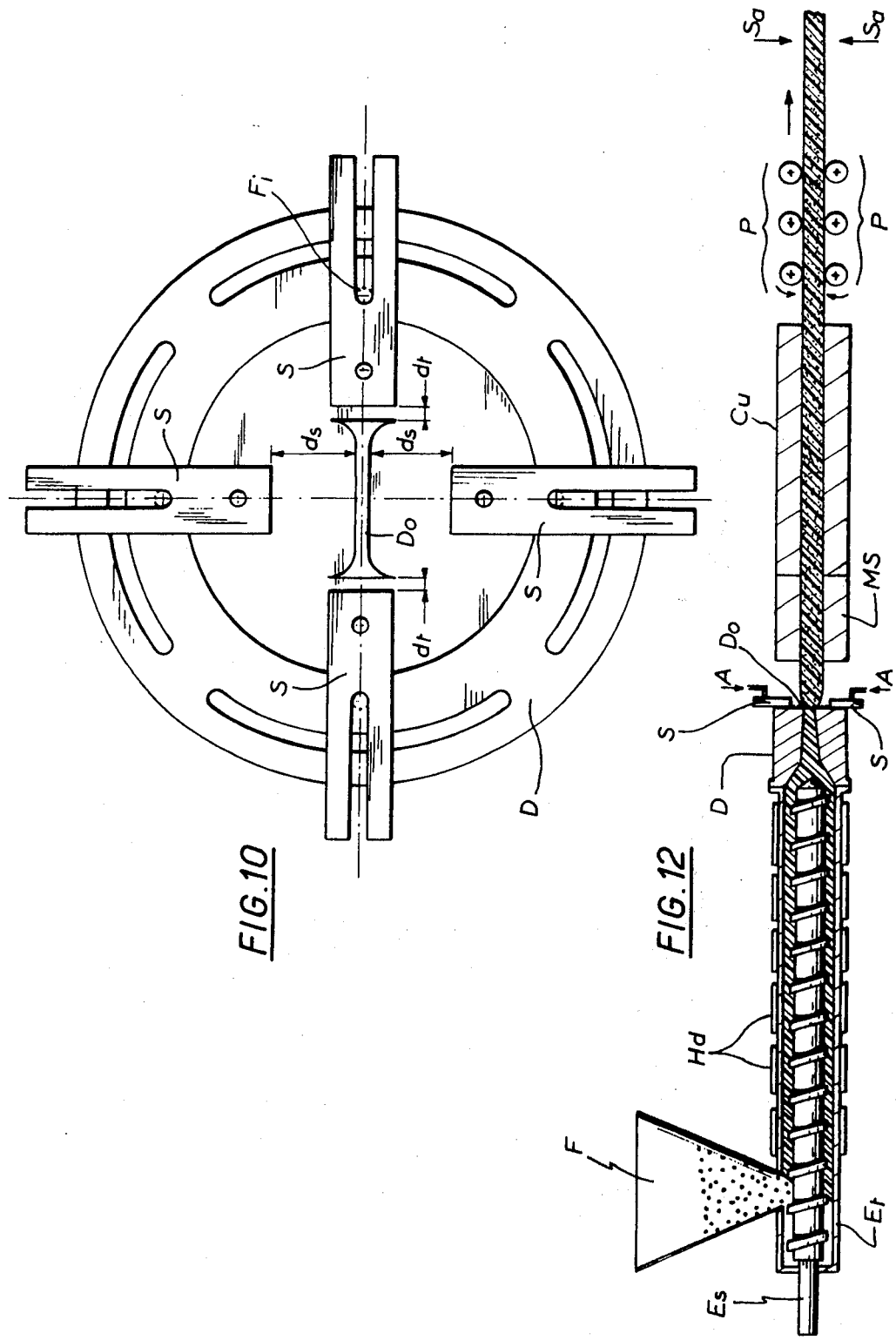

METHOD OF MANUFACTURE OF FOAMED THERMO-PLASTIC EXTRUDED SHAPES

FIELD OF INVENTION

This is a Continuation-in-Part of copending application Ser. No. 450,838 filed on Mar. 13, 1974 and now abandoned.

The present invention relates to a method of manufacture of foamed thermo-plastic extruded shapes hereafter referred to sections of any shape, including complex shapes, of structural foamed material, that is to say a material having a density of 0.4 to 0.9 with respect to the solid corresponding thermoplastic material.

More specifically, the method according to the invention is an extrusion method applied to a foamable or expandable thermo-plastic resin, the shaping effected by locally slowing down or inhibiting the expansion of the extrudate by blowing into the same a cooling fluid supplied from a plurality of blowing devices suitably located around said extrudate.

The thermo-plastic resins which are preferably used in the present method are selected from polystyrene, polyvinylchoride and co-polmers contaning one of these two substances.

BACKGROUND

For about twenty years it has been known to extrude solid thermo-plastic substances. In this case, the thermoplastic substance generally emerges from the extrusion machine through a die having substantially the shape and the dimensions of the object to be produced, and then passes, still in the plastic state, into a metallic shaping device having the shape and the dimensions of the object to be obtained in a more accurate manner than the die.

When it is sought to apply such a method of operation to expandable thermo-plastic materials, that is to say which contain a blowing agent in their formula, difficulties are met with, due to the fact that at the outlet of the die, the composition expands and thus gives an extruded product, the section of which is not homothetic to that of the die. In fact, in free expansion, the rate of expansion reached by an element of volume $dV$ of the extruded product in its final dimension is a function of the thickness of the die at the level of the element of corresponding original volume $dV$, and of the distance of this element of original volume $dv$ with respect to the centre of the die. The expansion increases when the thickness referred to increases and decreases when the distance referred to increases.

A die which is to be used in accordance with this technique is therefore very difficult to design.

Furthermore, the considerable friction of the extruded product on the internal surface of the metallic shaping device has the effect of limiting the linear extrusion speed of a section. It is no longer possible to avoid any excess of material at the intake of the shaping device and to eliminate the formation of folds and other irregularities at the surface of the section. The penetration of the extruded product into the metallic shaping device thus takes place against considerable resistance which results in a large stress in tension over the whole of the profile section.

The function of this conventional metallic shaping device is to shape the extruded product and to keep its section constant until it cools at a temperature lower than the softening temperature of the polymer. The time of passage of the extruded product through this shaping device thus constitutes an important factor.

If this time of passage is adequate, the final extruded product possesses a mechanical strength such that it can withstand without deformation the tensile force to which it is subjected. However, this tensile force must generally be high in order to overcome the friction forces developed between the extruded product and the shaping device.

If the extrusion speed is increased, which is undoubtedly a profitability parameter of the operation, the time of passage through the shaping device is reduced and in so doing the intensity of the heat-exchange is diminished, and therefore the mechanical strength of the extruded product is also reduced. Thus, for a shaping device of given length, there exists a maximum traction speed and therefore extrusion speed, beyond which there is a fracture of the extruded product in the shaping device.

In the prior art (see for example German application DOS No. 1,504,310) it has already been suggested to shape the sections by blowing a cooling fluid, this technique making use of the following phenomenon:

At the outlet of a die, the extruded product is permitted to expand freely, and in order to give it the desired shape, blowing is carried out with a cooling fluid at pre-determined points on its surface, towards the end or after the expansion. The cooling fluid thus reaches the material which is already expanded and still in the visco-elastic state, relatively far from the lips of the outlet of the die, and deformation takes place by contraction of the face which is thus cooled. There has thus been obtained by means of a single blowing nozzle, objects having the shape of a half-shell, and by means of several nozzles placed alternately on each side of the extruded sheet or plate, shapes which resemble those of corrugated sheets can be produced. This method does not however enable complex shapes to be produced, and in particular it does not permit the expansion to be controlled.

It is also known to obtain an unfoamed skin on already shaped or partly shaped foamed plastic extrudate by chilling the surface of said extrudate without any shaping action (see for example U.S. Pat. Nos. 3,363,034; 3,317,363; 3,311,681, and 3,299,192).

Moreover U.S. Pat. No. 3,835,209 discloses a process for extruding a foam sheet the thickness of which is controlled by cooling the web immediately after it leaves the orifice lips with a plurality of controllable gas streams. A web of polystyrene foam having a thickness of approximately 0.020 inches can be varied in thickness by at least 0.002 inches using air under pressure varying from 1 to 12 ounces per square inch. However a variation of about 10% in the thickness of a sheet does not permit to foresee the possibility of shaping various and even complex profile sections by a fluid cooling.

SUMMARY OF THE INVENTION

Now the present invention proposes on the one hand to palliate the disadvantages of the prior art while avoiding the obligations due to the design of the die and considerably reducing the friction in the metallic shaping device while attaining high extrusion speeds, and on the other hand enables various shapes to be produced which are not restricted to the form of half-shells, by virtue of the possibility of acting on the expansion.

The Applicant has in fact discovered that it was possible, by subjecting certain zones of a thermo-plastic material to differential cooling from the very beginning of the expansion by the action of jets of fluid under different cooling conditions with respect to the considered zones, said jets having a temperature lower than the softening temperature of the thermo-plastic material, and being peripherally distributed in order to slowdown or stop the expansion at the cooled zones while permitting the expansion to continue in the non-cooled areas. This phenomenon thus makes it possible to modify very largely the shape of the extruded product which may be due to an incorrect design of the die, and for this reason renders the creation and production of the desired shapes of sections much more easy.

The present invention thus provides a method which essentially comprises utilizng a conventional extrusion machine with its die, and producing the section of desired shape at the outlet of this die by the cooling action of at least two fluid shaping devices located around the product being extruded and placed as close as possible to the die orifice.

According to an advantageous embodiment the cooling devices are apertured pressure nozzles for impinging or spraying a cold fluid or mixtures of fluids such as air and water perpendicularly to the surface of the extrudate.

The extruded product passing out of the die and consisting of a material essentially in the plastic state, it is possible, according to the method of the invention, to prevent or reduce the expansion by acting on the flow-rate and/or, if so desired, on the temperature of the cooling fluid. Indeed, the phenomenon involved in the present method is based on expansion and not on mechanical stress. The extrudate is actually "distorted" by said expansion and the means used to limit and control said expansion is cooling by fluid jets without any compressive stress.

The invention also provides the apparatus and the installation for carrying out the above method.

The apparatus comprises essentially a conventional extrusion apparatus the die of which is immediately followed by the cooling fluid shaping device.

According to a particular form of embodiment, the installation for carrying out the method of the invention comprises an extrusion machine, a die, a shaping device with a cooling fluid, the distance between the outlet of the die and said fluid shaping device being from 0 to about 10 mm and preferably about 1 mm to about 2 mm and the distance from each apertured nozzle to the nearest die edge being from 1 to about 20 mm, preferably from 5 to 10 mm, a metallic shaping device, located at a distance from the fluid shaping device comprised between 0 and 400 mm, a cooling unit such as a water bath, a caterpillar puller and a sawing unit.

This installation is thus an installation of conventional type, into which there has been introduced the cooling fluid shaping means according to the invention, immediately at the outlet of the die and before the metallic shaping device.

In accordance with a preferred embodiment, the cooling fluid shaping device according to the invention is regulated in such a manner that the shaped extruded product which results has a section identical to that of the metallic shaping device. The metallic shaping device following this fluid shaping device then acts only as a gauge. As is well known per se, the resulting section obtained is then cooled in a water bath and passed into the puller and then sawed at the desired length.

Thus by varying the design of the die, the design and the location of the cooling fluid shaping devices according to the invention, and/or the flow-rate and/or the temperature of the cooling fluid, it is possible to shape parts having complex sections and/or to correct the imperfections of the die. It is to be noted that the design of the die and of the cooling fluid shaping device may be determined, in each case, by the man skilled in the art. Also as regards the flow-rate and the velocity of the fluid jets, no general range can be given since the velocity is a function of the slowdown of the expansion desired and the slowdown itself is a function of the rate of expansion of the material, of the shape to be obtained as well as of the rate of extrusion. In fact, this fluid velocity or pressure must be adjusted in each case.

The optimum conditions of extrusion are obtained when the extruded product formed by the cooling fluid shaping device according to the invention has at its inlet to the metallic shaping device a section which is practically identical to that of this latter.

BRIEF DESCRIPTION OF THE DRAWINGS

Other characteristic features and advantages of the invention will be brought out more clearly from the description which follows below, reference being made to the accompanying drawings, in which:

FIG. 8b is a front view corresponding to FIG. 8a,

FIG. 10 is a diagrammatic end view of the die the periphery shape section of which is illustrated in FIG. 9 combined with a fluid shaping device according to the invention, FIG. 12 is a diagrammatic elevational view of an installation carrying out the method of the invention.

DETAILED DESCRIPTION OF THE INVENTION

These drawings will be more clearly understood from examination of the following examples given by way of explanation and not in any limitative sense.

EXAMPLE 1

There has been extruded a section of the moulding type, having an area of 18.7 sq.cm. in an installation such as illustrated in FIG. 12 in which: F designates the feeding means of the thermoplastic material; Es designates the extrusion screw of the extruder Ex with its heating means Hd, its die D and die orifice Do; S designates the air shaping device of the invention with compressed air admitted in A; E designates the extruded issuing from the die; MS designates the metallic shaping device, Cu designates the cooling unit; P designates the puller and Sa designates the sawing unit.

The thermoplastic polymer was a high impact polystyrene with 3% poly-butadiene and containing, together with the usual additives (lubricants, anti-oxidizing agents, mineral fillers), a zeolite as blowing agent as described in French patent No. 2,177,584, cited here as a reference and which claims a method for the manufacture of objects of cellular thermoplastic material in which the material to be expanded is put at its conversion temperature into contact with a crystalline or partially crystalline, porous, hydrated substance itself characterized by the fact that its hydration and dehydration are reversible and do not irreversibly affect its crystalline structure, and such that the bonding with the molecules of the water of hydration is labile, such a zeolite substance being selected from the group of natural and synthetic zeolites introduced into the material to be expanded.

Figure 1:
FIG. 1 is a front view of the periphery of a die orifice section
Figure 2:
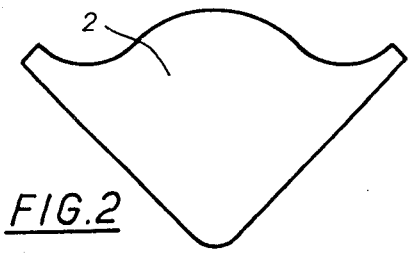
FIG. 2 is a front view of the periphery of the section of the metallic shaping device for a given section located downstream from the die orifice of FIG. 1, namely the cross-section of the extrudate 1.

The section of the die orifice 1 and that of the metallic shaping device 2 are as shown in FIGS. 1 and 2.

The shaping device according to the invention is an air shaping device comprising at least two and preferably four to eight apertures pressure nozzles such as 3 and 4, coupled by the conduits 5 and 6 to a source of compressed air. Each device is supplied with cold compressed air (at about 20° C) at a pressure determined by an accurate regulating device such as a needle valve, pressure-reducing gauge or the like (7,8).

The air may advantageously be replaced by another gas or by a mixture of gases or a suspension of a liquid in a gas (for example a water fog).

Each apertured pressure nozzle possesses a plurality of circular holes (preferably 10 to 40 holes) of small diameter (0.5 to 2 mm and preferably 1 mm) and of about 10 mm length permitting the air to escape so as to form a uniform wall of air.

Figure 3A:
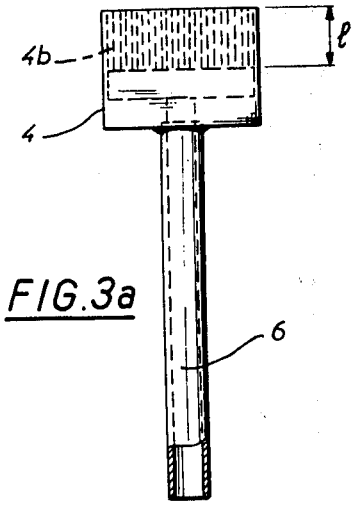
FIG. 3a and 3b are respectively an enlarged detailed elevational and plan view of a part of FIG. 3, FIG. 4, 5 and 6 represent diagrammatically various sections of extruded products at the outlet of the shaping device according to the invention.
Figure 3:
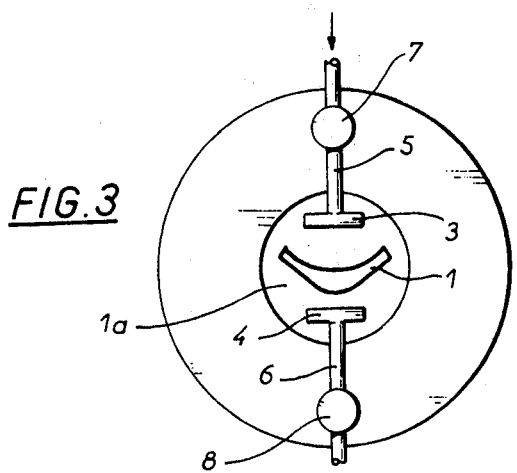
FIG. 3 is a diagrammatic front view of a die with the die orifice section shown in FIG. 1, combined with a fluid shaping device according to the invention.
Figure 3B:
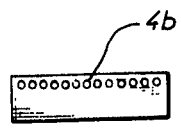

In FIG. 3a which is an enlarged and more detailed elevational view of the apertured pressure nozzle 4 of FIG. 3, the air under pressure is supplied to the tube 6 and then distributed through the thirteen holes 4b each having a diameter of 1 mm. The row of holes is located at 1 mm from that side of the apertured nozzle device (4) which is located against the die 1a, thus permitting the air to escape very close to the die outlet.

As it is very difficult to measure the velocity of the air escaping from each apertured nozzle, the pressure of the air will be quoted hereafter, in place of velocity. As a matter of fact, the main pressure loss occurs at the 1 mm diameter holes and so the length of these holes is important. The length (1) of the holes in this example 1 is 10 mm.

Also, in this example, the two apertured nozzle (3 and 4) shown in FIG. 3 are located in the vertical axis of said FIG. 3 and, on this vertical axis, the distance from each apertured nozzle to the nearest die edge orifice is respectively:

15 mm for the top apertured nozzle device 3
10 mm for the bottom apertured nozzle device 4.

Each apertured nozzle device may be positioned in such manner that the jets of air which are discharged from it are directed on to a predetermined zone of the external surface of the extruded product. In the example considered, the conditions of extrusion after reaching a steady state were as follows:

The extruding machine was of the type SAMAFOR 65-26 D.
Temperatures : 145°–155°–162°–165°/153°–180° C.
Temperature of the material in the die : 177° C
Speed of rotation of the screw : 43 r.p.m.
Pressure in the die : 120 bars
Pulling speed of the section :62 cm. per min.
Air shaping device
Pressure on the top apertured nozzle device 3 : 0.41 bar.
Pressure on bottom apertured nozzle device 4 : 0.12 bar.
Flow-rate of compressed air used : 3.2 cu.m. per hour.
Number of orifices per apertured nozzle device : top : 11 — bottom : 13
Diameter of the orifices : $\phi$ 1 mm.

Under these conditions of equilibrium of the output of the machine and of equilibrium of the various transfers of heat which takes place both at the level of the extruding machine Ex (FIG. 12) and at that of the die (D), the air shaping device (S), the gauge of the metallic shaping device MS and the cooling unit (Cu) which follows this latter, the extrusion gives an extrudate of good appearance, having a density equal to 0.5 which is pulled at P and sawed at Sa at the desired length.

Figure 4:
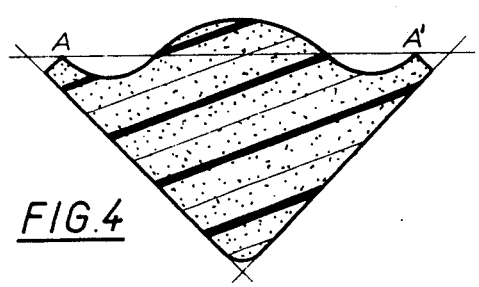
Figure 5:
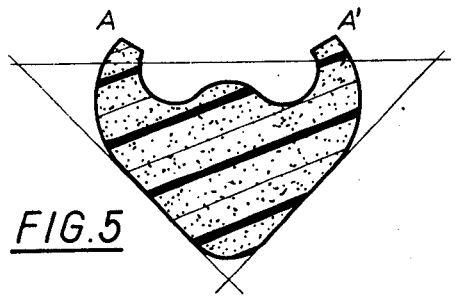
Figure 6:
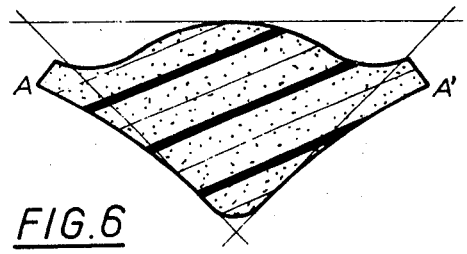

With these adjustments, the optimum extrusion conditions are obtained and the geometry of the extruded product being identically the same as that of the shaping device, especially the wings A–A' of the extruded product passing into the metallic shaping device in the desired position (see FIG. 4), a modification of the pressures in the top and bottom apertured nozzles causes a modification of the area of the section of the extruded product and of its geometry. Thus, FIG. 5 corresponds to a pressure on the top apertured nozzle 3 of 0.60 bar and a pressure on the bottom spray 4 of 0.12 bar, while for FIG. 6 the values of these pressures are 0.30 bar and 0.12 bar respectively.

The deformation obtained depends on :

$$\Delta P = P_H - P_B$$

$\Delta P$ = the difference in pressures;
$P_H$ = the pressure at the top apertured nozzle;
$P_B$ = the pressure at the bottom apertured nozzle.

The optimum value of $\Delta P$ varies of course for a given profile section with :
The output of the machines;
the extrusion temperature;
the nature of the polymer;
the rate and the nature of the expansion agent.

In the absence of air jets impinging on the surface of the extruded product the geometry of the extruded product is different from that of the metallic shaping device.

A defect in design of the die resulting for example in an asymmetry of the extruded product along the extrusion axis can also be corrected by the use of lateral spraying. It is in fact observed that air jets laterally impinging on the surface of the extruded product with a pressure as low as 0.1 bar for example, deform the extruded product considerably.

EXAMPLE 2

Figure 8:
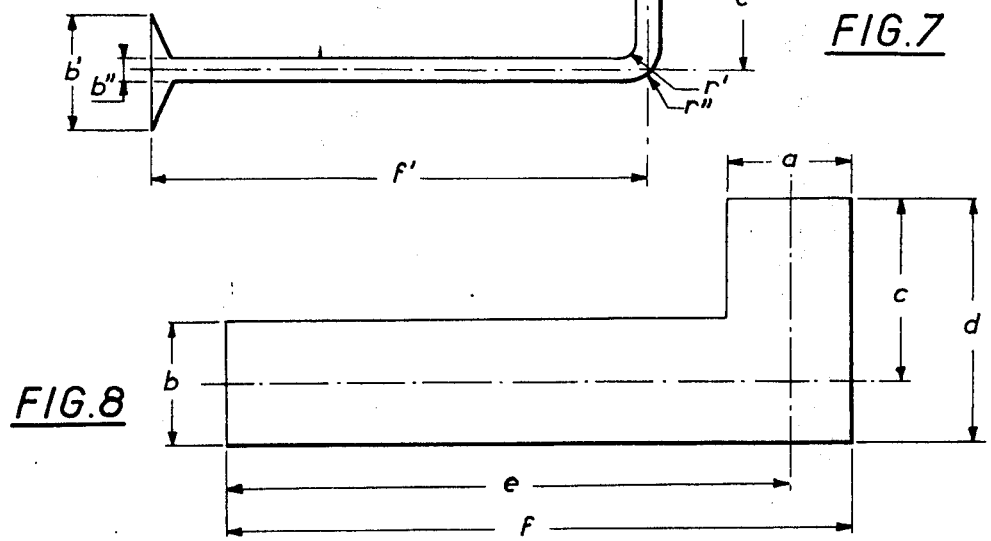
FIG. 8 shows the L-shape section which is obtained starting from the die orifice section the periphery of which is illustrated in FIG. 7.

There was produced an L-shaped length having the cross-section shape illustrated on FIG. 8.

The thermo-plastic polymer was a high impact polystyrene with 4.5% of polybutadiene and containing azodicarbonamide as blowing agent together with the usual additives (lubricants, antioxidizing agents, mineral fillers).

Figure 7:
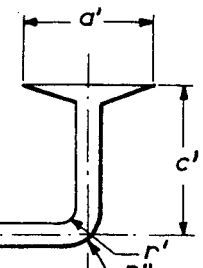
FIG. 7 is a view of another periphery shape of a die orifice section.

The cross-section area of the length obtained was 2,400 mm² with the following dimensions (see FIG. 8):
a = 20 mm
b = 20 mm
c = 30 mm
d = 40 mm
e = 90 mm, and
f = 100 mm This length was obtained from the die the outlet section of which had the shape illustraded in FIG. 7 having the following dimensions :
a' = 20 mm
b' = 20 mm
c' = 25 mm
b'' = 4 mm
f' = 80 mm
r' = 2 mm, and
r'' = 6 mm The inner cross-section dimensions of the metallic shaping device were identical to those of the cross-section of the length to be produced.

The apertured nozzles used were designed and disposed in such a way that the air jets hit the surface of the extrudate as it leaves the die.

Figure 8A:
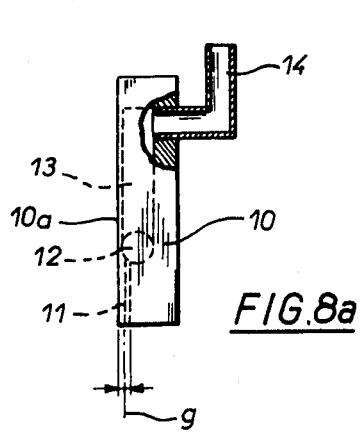
FIG. 8a is an elevational side view of an apertured nozzle device used in the invention.
Figure 8B:
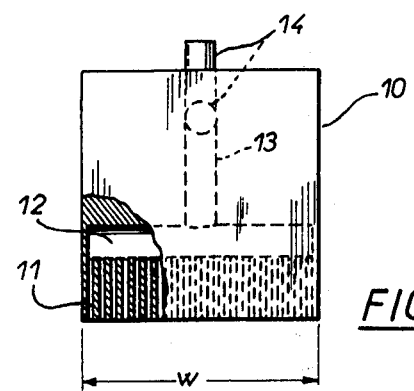

FIGS. 8a and 8b illustrated (in side and front views) the design of one of the apertured pressure nozzle devices which were used in this example. This device is constituted by a plate 10 (having a thickness of 10 mm), the lower portion of which having a series of nineteen holes (11) of 1 mm diameter and 10 mm length and spaced by 1 mm from each other. The useful width (w) of this device is of 40mm. The holes 11 are connected to a channel (12) having a diameter of 5 mm said channel being in its turn connected through the tubes 13–14 to an air pressure circuit supplying air under controlled pressure. The side view (FIG. 8a) shows that the series of 1 mm diameter holes are bored at a distance (g) from the surface 10a (which are to be adapted against the wall of the die) of the plate 10 said distance being of 1 mm. Under these conditions the air jets effectively hit the surface of the extrudate as it leaves the die.

Figure 8C:
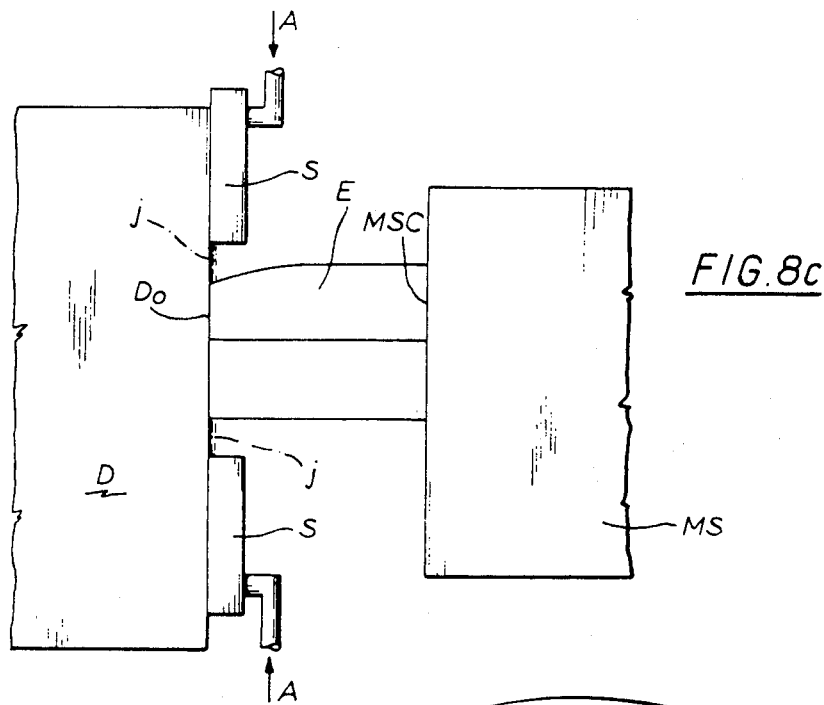
FIG. 8c is a diagrammatic elevational view of a part of the installation used for carrying out the method of the invention.

FIG. 8c illustrates schematically the use of two devices such described above. In this figure the reference D designates the die, Do designates the die orifice of the appropriate cross-section, S designates each apertured nozzle device such as described above with its air supply from A, the reference J designates the air jet streams, the reference E designates the extrudate and the reference MS designates the metalic shaping device with its appropriate cross-section MSC.

Figure 8D:
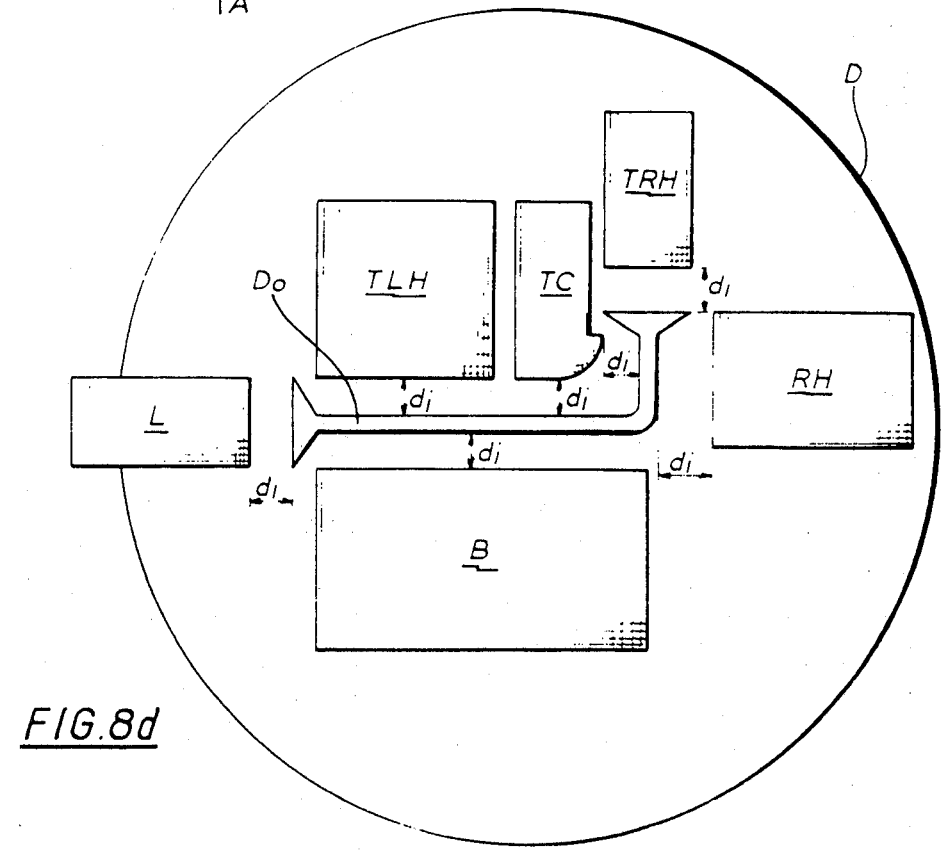
FIG. 8d is a diagrammatic front view of the die with the air shaping device used for obtaining the extrudate of the periphery shape section illustrated in FIG. 8.

FIG. 8d is an illlustrative front view of the die (the section shape of which having been described above with reference to FIG. 7) together with the location of the pressure sprays the top left hand device (TLH) being that already described with reference to FIGS. 8a–8b (with a useful width of 40 mm). The other similar apertured nozzle devices (top right-hand (TRH), right-hand (RH), bottom (B) and left (L) ) are of such a width and geometry that their combined use allows coverage of all the periphery of the output of the die orifice. The useful width of each of said devices and its distance (di) to the nearest die edge are:

| Apertured nozzle device | (di) in mm | useful width |
| --- | --- | --- |
| TLH | 10 | 40 mm |
| TRH | 10 | 20 mm |
| RH | 13 | 30 mm |
| B | 10 | 75 mm |
| L | 10 | 20 mm |

The top-center device (TC) is particular in that its geometry allows the air jets to hit the inner corner of the L-shaped section. Its distance (di) to the nearest die edges is 10 mm.

The number of holes (such as 11) for each apertured nozzle device are :
TLH: 19
TC: 21
TRH: 9
RH: 14
L: 9
B: 40

The operating conditions used in this example were as follows:
Extruding macine type : SAMAFOR 65-26 D
Temperature : 145°–195°–165°–150°/160° C
Temperature of the material in the die : 194° C
Speed of rotation of the screw : 47 r.p.m.
Pressure in the die : 95 bars
Pulling speed of the section : 43 cm per min.
Air shaping device with six apertured nozzle devices :

Top left hand pressure : 0.400 bar
Top center pressure : 0.300 bar
Top right hand pressure : 0.020 bar
Right-hand pressure : 0.120 bar
Left-hand pressure : 0.020 bar
Bottom pressure : 0.300 bar
Diameter of all the holes : 1 mm
Length of the holes : 10 mm
The density of the extrudate length obtained was 0.60.

EXAMPLE 3

Figure 11:
FIG. 11 represents the rectangular section of the extruded product which is obtained with the die orifice section the periphery of which is illustrated in FIGS. 9 and 10.

There was extruded a length of rectangular section of 80 × 30 mm² (FIG. 11) of homopolymer of polystyrene containing azodicarbonamide as blowing agent with the usual additives (lubricants, anti-oxidizing agents, mineral fillers).

Figure 9:
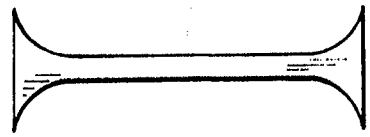
FIG. 9 is a view of a third example of the periphery of a die orifice section.

The cross-section shape of the die orifice is that shown in FIGS. 9 and 10.

Referring to FIG. 10 the four apertures nozzle devices S are of the type already described with reference to FIG. 8a–8b. These devices are mounted on the front wall of the die D provided with its die orifice. Do having the above cross-section shape, by means of the forked-nut system Fi. Each apertured nozzle device comprises 10 holes of a diameter of 1 mm and the length of each hole is 10 mm.

The distances from the top and bottom apertured nozzle devices to the nearest die edge orifice are 15 mm and the distance dt from the right and left apertured nozzle devices to nearest die edge orifice are 5 mm.

The operating conditions were as follows :
Extruding machine type : SAMAFOR 65-26 D
Temperatures : 152°–190°–170°–165°/160°–170° C
Temperature of the material in the die : 194° C
Speed of rotation of the screw : 62 r.p.m.
Pressure in the die : 60 bars
Pulling speed of the section : 72 cm/minute
Air pressure at the top apertured nozzle device : 0.180 bar
Air pressure at the bottom spray device : 0.080 bar
Air pressure at the right hand apertured nozzle device : 0.050 bar
Air pressure at the left hand apertured nozzle device : 0.030 bar
The density of the plastic length obtained was 0.50.

EXAMPLE 4

Using the devices described in Example 3 there was extruded a rectangular length of 80 × 30 mm 2 of rigid polyvinyl chloride having a K value of 57 and containing azo-dicarbonamide as blowing agent, together with the usual additives (lubricants, anti-oxidizing agents, mineral fillers and stabilizing agents).

The operating conditions were as follows :
Extruding machine type : SAMAFOR 65-26 D
Extrusion temperatures : 140°–160° C–165°–165°/160°–160° C
Temperature of the material : 190° C in the die.
Speed of rotation of the screw : 22 r.p.m.
Pressure in the die : 70 bars
Pulling speed of the section : 48 cm/minute
Air shaping device :
Top pressure : 0.0260 bar
Bottom pressure : 0.410 bar
Left-hand pressure : 0.480 bar
Right-hand pressure : 0.400 bar
Density of the plastic length obtained : 0.59.

The present invention thus makes it possible to obtain lengths having various sections.

It will of course be understood that the present invention has been described purely by way of explanation and not in any limitative sense, and that any useful modification may be made there to without thereby departing from its scope as defined in appended Claims.

I claim:

1. A method for the extrusion-manufacturing of a diversity of structural foamed thermoplastic material shaped sections of indefinite length and having a density of 0.4 to 0.9 with respect to the corresponding solid thermoplastic material, said method comprising:
   extruding a foamable thermoplastic material from an extruder through a die orifice with an initial shape section the material beginning to expand at the outlet of said die;
   modifying the shape-section of the expanding extrudate by partially slowing-down or stopping the expansion in pre-selected zones of said extrudate immediately at the outlet of said die orifice by differently cooling said zones with a plurality of jets of cooling fluid under pressure and having a temperature lower than the softening temperature of the thermoplastic material, said jets having a peripheral distribution, constituting a fluid shaping device, while permitting the expansion to continue in the non-cooled zones, whereby an extrudate having a shape-section different from that of said initial die shape is formed,
   and finally fixing the resulting shape by cooling.

2. A method as claimed in claim 1, in which the fixing of the resulting shape is achieved by passing said shape through a cooled metallic shaping device having an inner section substantially identical to said shape and subsequently through a water bath.

3. A method as claimed in claim 1, in which the distance between the outlet of the die orifice and said fluid shaping device is from about 0 to about 10 mm and the distance from each apertured nozzle device to the nearest die edge orifice is from 1 to about 20 mm.

4. A method as claimed in claim 2, in which said cooled metallic shaping device is located at a distance from said fluid shaping comprised between 0 and about 400 mm.

5. A method as claimed in claim 1, in which said cooling fluid is air.

6. A method as claimed in claim 3, in which said fluid shaping device comprises apertured air nozzel devices and said air is directed through 10 to 40 holes of a diameter of from 0.5 to 2 mm, preferably of a diameter of 1 mm, and having a length of about 10 mm, under an air pressure of from 0.010 to 1.2 bars.

7. A method as claimed in claim 1 in which the expansion of said expanding extrudate is partially sloweddown or stopped at the pre-selected zones by varying the flow-rate of said cooling fluid.

8. A method as claimed in claim 1, in which the expansion of said expanding extrudate is partially sloweddown or stopped at the pre-selected zones by varying the temperature of said cooling fluid.

9. A method as claimed in claim 1, in which said thermoplastic material contains polymers selected from the group consisting of polyvinyl chloride, polystyrene and the copolymers containing one of these two substances.

10. A method in accordance with claim 3 wherein the distance between the outlet of said die orifice and said fluid shaping device is about 1-2 mm, and the distance from each apertured nozzle device to the nearest die edge is 5-10 mm.

* * * * *